United States Patent [19]
Simon et al.

[11] 3,887,040
[45] June 3, 1975

[54] BRAKE LINING THICKNESS MONITORING DEVICE

[75] Inventors: Ernst-Ulrich Simon, Oberursel; Horst Ullrich, Schoeneck, both of Germany

[73] Assignee: VDO Adolf Schindling AG, Hamburg, Germany

[22] Filed: Nov. 8, 1973

[21] Appl. No.: 413,869

[30] Foreign Application Priority Data
Nov. 10, 1972 Germany............................ 2254990

[52] U.S. Cl................................. 188/1 A; 340/52 A
[51] Int. Cl............................................. F16d 66/02
[58] Field of Search............ 188/1 A; 200/61.4, 44; 340/52 A; 73/129

[56] References Cited
UNITED STATES PATENTS

| | | | |
|---|---|---|---|
| 3,388,773 | 6/1968 | Quinn | 188/1 A |
| 3,670,300 | 6/1972 | Depenheuer | 340/52 A |
| 3,802,257 | 4/1974 | Jorenda et al. | 188/1 A X |
| 3,808,593 | 4/1974 | Kopernik et al. | 188/1 A UX |

*Primary Examiner*—Duane A. Reger
*Attorney, Agent, or Firm*—Otto John Munz

[57] ABSTRACT

A device for monitoring the thickness of a wearable lining, such as a brake lining in vehicles with an available power source, while in operative attachment to a movable support such as a brake shoe, comprising two monitoring parts, a resistance detector and a slider contacting an indicator; said two members assembled to move relative to each other on a common longitudinal axis with a protective resilient sleeve surrounding the junction of said two members; one of the members carrying the resistance detector and the other the frictional contact, with at least one carrying the monitoring part which is mounted in operative engagement with the brake shoe.

The varying thickness of the brake lining deleted by the amount of displacement of the brake shoe is measured by the resistance detector.

In preferred embodiments of the invention the two members are telescoping one into the other. Preferably each member is provided with a carrying arm for its monitoring part and means are provided to permit a quick simple mating attachment between the two monitoring parts and the respective carrying arms. The two monitoring parts are mounted between the brake shoe and a brake saddle and a stop boss is provided at least on one of the two telescoping members spaced a distance from the carrying arm corresponding to the thickness of the lining.

8 Claims, 3 Drawing Figures

SPRING MEANS TO MOVE 11a AND 12a AGAINST EACH OTHER

BRAKE LINING THICKNESS MONITORING DEVICE

DESCRIPTION OF THE PRIOR ART

U.S. Pat. No. 3,604,865 of Sept. 14, 1971 to Carl E. Bricker for a Brake Position Indicator discloses a system indicating when a lining of a disc brake is in contact with the brake disc, which employs a first and a second pin, a piston attached to the first pin, a microswitch attached to the piston, the second pin in contact with a lever of the microswitch as the piston moves toward the disc only when the piston moves beyond a predetermined amount.

U.S. Pat. No. 3,716,113 of Feb. 13, 1973 to T. Kobayashi et al. for Warning Device For Indicating Wear Of A Friction Pad In Disc Brake describes detecting means to detecting circuit with a switch which is normally closed and opens when the pad is worn to a predetermined thickness and a warning circuit actuated at such a moment.

U.S. Pat. No. 3,716,832 of Feb. 13, 1973 to Frank J. Gorgie et al. for Brake Lining Condition Inditor System employs an electrical conducting rod extending into the underside of the brake lining, wearing down together with the lining. A display device is provided to indicate when the braking surface contacts the rod.

Another system provides electrical resistances such as graphite rods embedded in the lining and as the rods wear down together with the lining, the total resistance of the lining is measured by the proportion of the decrease in the size of the rod.

The disadvantages of the prior art devices are:
difficulties with or impossibility of attaching them to already existing conventional brake systems;
inaccuracies inherent in these systems, because they lack protection from dirtying of the brake linings and brake shoes and from atmospheric influences;
their complexity and great manufacturing and maintenance expenses; and
time consuming and costly matching them with those brake systems in which installation thereof is possible.

The exchange of linings in these or during the replacement of worn out systems of the prior art also require specialized knowledge and practical experience.

SUMMARY OF THE INVENTION

The objects of the invention are:
to eliminate the disadvantages of the prior art outlined above;
to provide a brake lining monitoring system which will perform accurately notwithstanding atmospheric conditions and prevent accumulation of dirt at the critical places thereof;
to provide a device of the type mentioned which is easy to install by inexperienced and unskilled help in disc brakes already in existence and which is simple to incorporate into newly constructed disc brakes and to provide a device which does not interfere with an easy and quick replacement of brake linings and the repairs of disc brakes;
to provide a monitoring device of the kind described which permits the use of brake linings of various thicknesses without affecting the accuracy of their respective measurements;
to provide a monitoring device which necessitates the use of a minimum space, without affecting the accuracy and ease of assembly and of exchange of the used brake linings.

Other objects and many of the advantages of the present invention will become apparent to those skilled in the art from the following specification and drawings, in which like reference numerals denote same or equivalent parts or structures.

DESCRIPTION OF THE PREFERRED EMBODIMENTS

Figure 1:
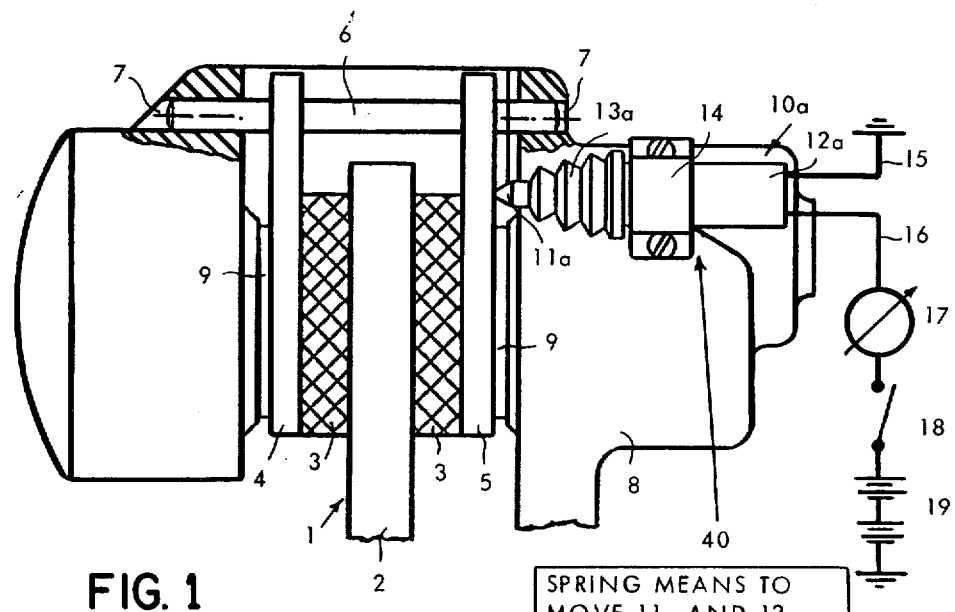
FIG. 1 is a sideview, partly in cross-section, of an embodiment of the device of the invention, employing a resistance mounted on a brake saddle.

In principle the monitoring device comprises two telescoping members, movable relative to each other and one sliding within the other. The telescoping members are provided at their junction with a resilient sleeve protecting that vital portion of the device from dirt, moisture and adverse atmospheric conditions.

The two members carry the two basic monitoring parts.

One of the members carries the resistance detector and the other a slider. At least one of the two components parts is mounted in operative contact with a brake shoe.

The device thus outlined measures the amount of displacement of the brake shoe, which is the measure of the thickness of the brake lining at a given moment. Thus brake linings of various thicknesses may be used without affecting adversely the accuracy of their measurements.

The ease of exchangeability of the brake lining already mounted on the shoe is not adversely affected by the present device.

The protective sleeve provides a safety guard against dirt and atmosphere for accurate measurements.

A holding arm with a mating holding pin is provided for each one of the two component monitoring parts to permit their easy simple assembly and mounting on the holding pin of the brake shoe.

In a preferred embodiment each holding arm is provided with a hole for the holding pin and a longitudinal slot which continues in the hole and which at least in the vicinity of the hole has a width smaller than the diameter of the hole.

This use of the holding arms permits an easy assembly of the resistance detector by simply pushing it upon the holding pin of the brake shoe. In particular, it is also simple to attach the device of the invention to older brake devices which preexist.

As an alternative to the pushing of the resistance detector upon the holding pin of the brake shoe, it may be attached with one of its two parts to the brake saddle, whereby the other free part is mounted into contact with the rear side of one of the two brake shoes. The advantage of this assembly over the one described prior heretofore is that the exchange of the brake linings may be carried out more easily. Additional means for mounting are, however, required and tensioning of the brake saddle must then be used.

In order to provide for a faultless positioning of the two members relative to each other dependent upon the thickness of the brake lining in the abovementioned embodiment of the device which deals with locating the resistance detector upon the holding pin, the holding arms preferably are arranged between one brake shoe and the brake saddle, and at least at one portion of the holding arm which is spaced from it a distance equal to the thickness of the brake lining is provided with a stop boss.

When, however, such an arrangement of the holding arms is impractical because of space requirements, or for other reasons, or when a resistance indicator is employed, which is attached with one of its parts to the brake saddle, a compression spring is interposed between the two members, which rests against the brake shoes or against the movable portion of the brake shoe which is near it.

By using such a spring, the attachment of the brake shoe and of the resistor, or of other means of attachment, may be omitted and installation of the resistance detector and of an exchange of the brake lining is not affected adversely.

In a preferred embodiment of the invention, one of the members of the resistance detector is developed as a pipe and the other member as a cap. The resistance carrier is mounted in the cap movably and fixably. Its free end carries contact means for sliding in a guide rail, which is mounted to the other end and a slider is mounted in contact with the resistance arranged opposite thereto. This type of the construction of the monitoring device is particularly space saving. The guide rail and the slider preferably are held by an end closure of the pipe member. This arrangement of the guide rail and slider is technologically simpler and more superior to that used in the prior art.

As shown on FIG. 1, the basic brake 1 comprises a brake disc 2 and two brake linings 3 between which runs the disc, two brake shoes 4 and 5, a holding pin 6 for the two brake shoes and a brake saddle 8 provided with two holes 7 for the holding pin. Hydraulically operated pistons 9 are operatively connected with the two brake shoes.

The measuring of the thickness of the brake lining is accomplished by a monitoring resistance detector 10a. The resistance detector comprises two telescoping members 11a and 12a, one sliding within the other with a protective resilient sleeve 13a surrounding them at their junction. A portion 10a of the telescoping member 12a is attached by a clamp 14 to the brake saddle. The other telescoping member 11a is positioned against the rear side of the brake shoe 5. Both telescoping members are movable against a spring means 40, shown on FIG. 1 diagrammatically.

Electric circuit connection 16 connects one pole of the resistor to a conventional indicator or signalling device 17, which in turn connects with switch 18.

The other contact 15 connects to an electric battery 19, whose other pole connects with the base of switch 18.

Figure 2:
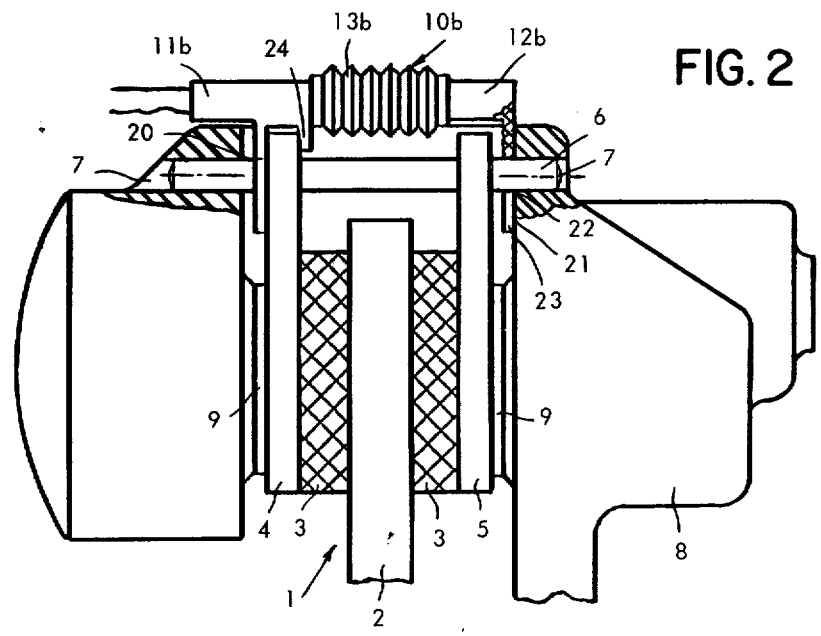
FIG. 2 is a sideview and partly in cross-section of an embodiment of the invention similar to that of FIG. 1, showing the resistance mounted on a carrying pin of the brake shoe.

The embodiment of the invention depicted on FIG. 2 analogously employs as the resistance detector 10 two telescopic members 11b and 12b, such as described with reference to FIG. 1, one movable within and relative to the other and surrounded by a resilient sleeve 13b. The resistance detector is mounted on the carrying pin 6 for the brake shoes 4 and 5.

For this purpose each of the two telescoping members is providied with a holding arm 20 and 21 respectively. Each holding arm is provided with a hole 22 for the holding pin 6 and a longitudinal slot 23 which ends in the hole 22. The width of the slot in the vicinity of the hole is smaller than the diameter of the hole.

The holding arm 20 and 21, each, is arranged between one of the brake shoes 4 and 5 respectively and the brake saddle 8. A boss 24 is provided on the telescoping member 11b spaced from the holding arm 20 a distance equal to the thickness of the brake shoe 4 to assure a correct displacement of the two telescoping members.

Figure 3:
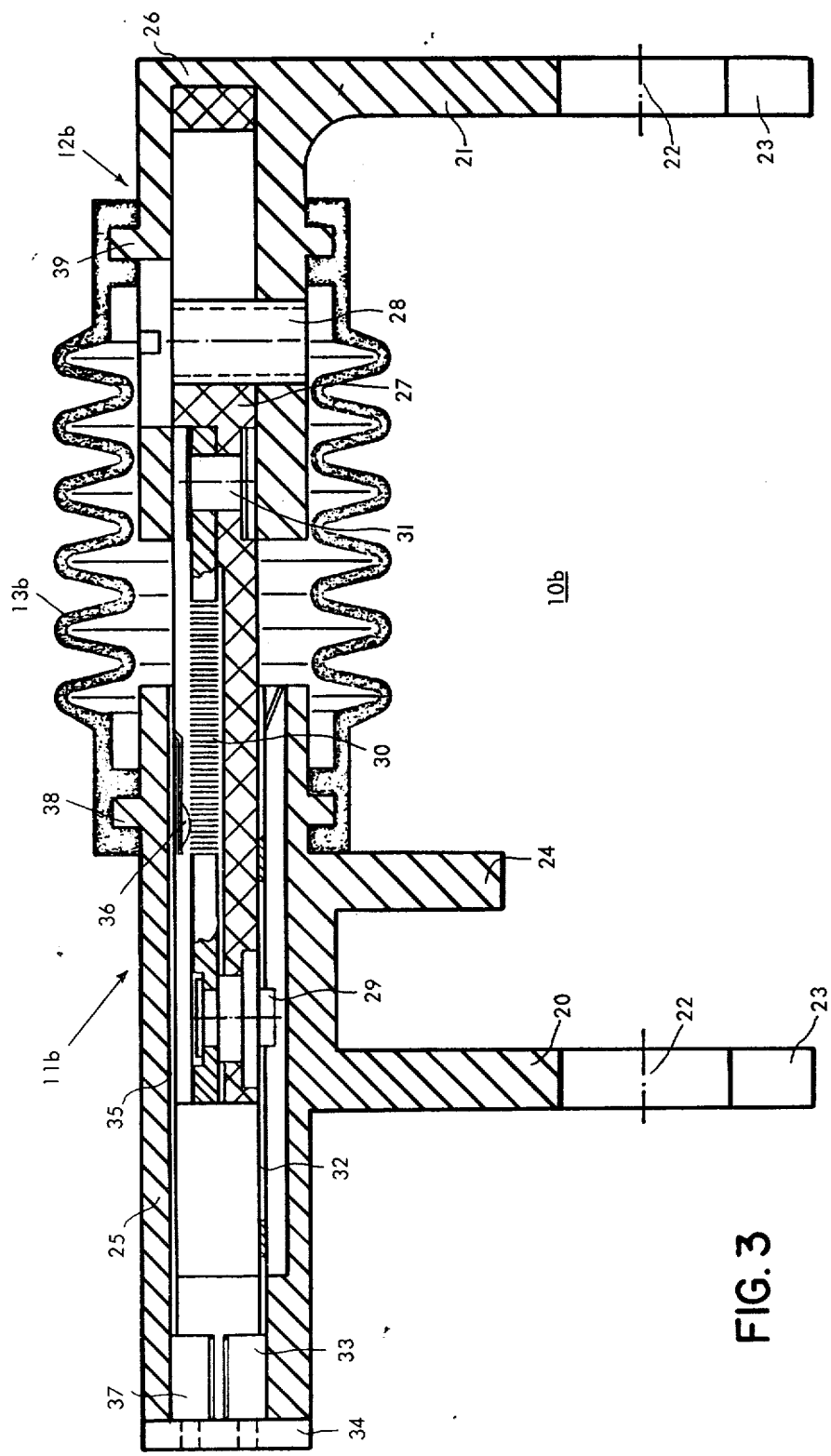
FIG. 3 is a longitudinal cross-sectional view of the embodiment depicted on FIG. 2.

As depicted on FIG. 3 the portion 11b of the resistance detector 10b is developed as a pipe 25 of a rectangular cross-section. The member 12b is composed of a cap 26 of a rectangular cross-section and a resistance carrier 27, which is arranged in the cap 26 for axial movements to establish the zero point by a set screw 28.

The free end of the resistance carrier 27 is provided with contact 29 by which the resistance 30 on its one end is fixedly mounted to the resistance carrier 27 and to which is electrically connected one end of the resistance 30. The other end of the resistance 30 is riveted to the resistance carrier 27 by a rivet 31.

The resistance carrier 27 is supported with its contact 29 by a first guide rail 32, which ends with its rear end in two tongues 33, which in turn surround the end closing member 34 of the pipe 25.

A second guide rail 35, provided opposite the first guide rail 32, has its front end developed as a slider 36 and its rear end as two flaps 37 which surround the end closing member 34. Thus both guide rails 32 and 34 are securely held in the pipe 25.

The end of the pipe which is adjacent to the resistance 30 is shaped as a band 38. A corresponding band 39 is positioned on the cap 26 between the screw 28 and the holding arm 21. Both bands 38 and 39 serve as attachment means for the resilient sleeve 13b, which is provided for this purpose on both ends with corresponding grooves. Thus the resistance space is protected from dust and wetness.

What is claimed:

1. A device for monitoring the thickness of a brake lining of a disc brake, having a disc with a brake shoe and lining on each side thereof, particularly in automotive vehicles provided with a power source, comprising:
   two monitoring parts, a resistance and a slider;
   an indicator of the thickness of the brake lining;
   two telescoping members, mounted for relative axial movements one within the other externally of the said brake shoe and perpendicularly thereto;
   a resilient protective sleeve surrounding the junction of said two telescoping members;
   said resistance carried by one said telescoping member;
   said slider carried by the other said telescopic member;
   at least one of said two monitoring parts mounted in operative engagement with the outer side of said disc.

2. A monitoring device as claimed in claim 1, further comprising:

a holding pin for the said brake shoe;

each said member being provided with a holding arm shaped for attachment with the said holding pin.

3. A monitoring device as claimed in claim 2, comprising: a hole for the holding pin in the holding arm of each said member and a longitudinal slot orificing into the said hole, having a width which at least in the vicinity of the hole is smaller than the diameter of said hole.

4. A monitoring device as claimed in claim 1, further comprising:

a compression spring positioned between said two telescoping members, supported by one of said members.

5. A monitoring device as claimed in claim 2, further comprising:

a brake saddle;

each said holding arm arranged between one brake shoe and the brake saddle and a stop boss provided on at least one of said two members, spaced a distance from the respective holding arm equivalent to the thickness of the brake lining.

6. A monitoring device as claimed in claim 1, one of said telescoping members being pipe shaped, the other said member comprising a cap and a resistance carrier mounted within the cap axially movably and settably, the free end of said resistance carrier provided with an attachment contact;

a guide rail mounted on the other member, opposite from the said slider, which is in contact with the said resistance, said attachment contact mounted slidably on said guide rail;

said slider arranged in contact with said resistance.

7. A monitoring device as claimed in claim 6, said pipe shaped member comprising an end closure, the said guide rail and the slider held by the end closure.

8. A device for monitoring the thickness of a brake lining of a disc brake, having a disc with a brake shoe and lining on each side thereof, particularly in automotive vehicles provided with a power source, comprising:

two monitoring parts, a resistance and a slider;

an indicator of the thickness of the brake lining;

two telescoping members, mounted for relative axial movements one within the other externally of the said brake shoe and perpendicularly thereto;

a resilient protective sleeve surrounding the junction of said two telescoping members;

said resistance carried by one said telescoping member;

said slider carried by the other said telescopic member;

said two monitoring parts mounted in operative engagement with the outer side of said brake shoe;

a holding pin for the said brake shoe;

each said member being provided with a holding arm shaped for attachment with the said holding pin;

a hole for the holding pin in the holding arm of each said member and a longitudinal slot orificing into the said hole, having a width which at least in the vicinity of the hole is smaller than the diameter of said hole.

* * * * *